US012719884B2

(12) United States Patent
Zifroni et al.

(10) Patent No.: US 12,719,884 B2
(45) **Date of Patent: *Aug. 25, 2026**

(54) SYSTEM AND METHOD FOR INTRUSION DETECTION OF MALWARE TRAFFIC BASED ON FEATURE INFORMATION

(71) Applicant: Marvell Asia Pte Ltd, Singapore (SG)

(72) Inventors: Dovrat Zifroni, Shoham (IL); Michael Shamis, Netanya (IL)

(73) Assignee: Marvell Asia Pte Ltd, Singapore (SG)

( * ) Notice: Subject to any disclaimer, the term of this patent is extended or adjusted under 35 U.S.C. 154(b) by 201 days.

This patent is subject to a terminal disclaimer.

(21) Appl. No.: 17/548,111

(22) Filed: Dec. 10, 2021

(65) Prior Publication Data

US 2022/0191223 A1 Jun. 16, 2022

Related U.S. Application Data

(60) Provisional application No. 63/124,573, filed on Dec. 11, 2020.

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/0236* (2013.01); (Continued)

(58) Field of Classification Search
None
See application file for complete search history.

(56) References Cited

U.S. PATENT DOCUMENTS 8,341,724 B1 * 12/2012 Burns ..................... H04L 69/22 709/224
10,394,721 B2 8/2019 Panesar et al.
(Continued)

FOREIGN PATENT DOCUMENTS

WO 2022/123317 A1 6/2022

OTHER PUBLICATIONS

PCT International Preliminary Report on Patentability for International Application No. PCT/IB2021/000885, entitled "System and Method for Intrusion Detection of Malware in Encrypted and Non-Encrypted Traffic;" mailed on Jun. 13, 2023.
(Continued)

*Primary Examiner* — Trang T Doan
(74) *Attorney, Agent, or Firm* — Hamilton, Brook, Smith & Reynolds, P.C.

(57) ABSTRACT

A system-on-a-chip (SoC) and corresponding method implement an intrusion detection system. The SoC comprises a traffic scanner that produces feature information associated with non-payload content of encrypted packets in a received traffic stream that cannot be decrypted by the SoC. The SoC further comprises a machine learning (ML) engine that (i) assigns a classification to the received traffic stream based on the feature information produced and (ii) based on the classification assigned, provides notification to the traffic scanner that malware traffic has been detected in the traffic stream. The traffic scanner further performs, based on the notification provided, an action toward preventing malicious activity otherwise caused by malware traffic.

22 Claims, 10 Drawing Sheets

(52) U.S. Cl.
CPC ........ *H04L 63/1425* (2013.01); *H04L 63/145* (2013.01); *H04L 63/20* (2013.01)

(56) References Cited

U.S. PATENT DOCUMENTS

| | | | | |
|---|---|---|---|---|
| 11,563,758 | B2 | 1/2023 | Ahn et al. | |
| 11,575,662 | B2 | 2/2023 | Chaubey | |
| 12,549,565 | B2 | 2/2026 | Zifroni et al. | |
| 2014/0215621 | A1* | 7/2014 | Xaypanya | H04L 63/145 726/23 |
| 2015/0373039 | A1 | 12/2015 | Wang | |
| 2019/0245866 | A1* | 8/2019 | Anderson | H04L 63/166 |
| 2019/0391888 | A1* | 12/2019 | Meriac | G06F 11/1497 |
| 2020/0293655 | A1* | 9/2020 | Long | G06N 20/00 |
| 2020/0314491 | A1 | 10/2020 | Rodgers et al. | |
| 2020/0334355 | A1* | 10/2020 | Klein | G06F 21/62 |
| 2020/0358822 | A1* | 11/2020 | Erickson | H04L 63/123 |
| 2021/0149824 | A1 | 5/2021 | Satpathy et al. | |
| 2021/0152526 | A1* | 5/2021 | Kohout | H04L 41/12 |
| 2021/0182413 | A1 | 6/2021 | Agarwal | |
| 2021/0312055 | A1 | 10/2021 | Kloth | |
| 2022/0103578 | A1* | 3/2022 | Srivastav | H04L 67/12 |
| 2022/0191222 | A1 | 6/2022 | Zifroni et al. | |

OTHER PUBLICATIONS

Alqudah et al., "Machine Learning for Traffic Analysis: A Review," ScienceDirect, Procedia Computer Science 170 (2020) 911-916.

Business Review, "Cisco Catalyst 9000 switches detect malware in encrypted traffic without decryption," Newsroom Jun. 2, 2019.

Caprolu et al., "Cryptomining Makes Noise: a Machine Learning Approach for Cryptojacking Detection," Jan. 28, 2020, Hamad Bin Khalifa University (HBKU), College of Science and Engineering (CSE), Division of Information and Computing Technology (ICT). Doha, Qatar.

Cisco Secure, "CISCO Secure Network Analytics, A deep-dive into the unique behavioral modeling and machine learning techniques for advanced threat detection and response," White Paper, CISCO Public, 2020.

Cisco Public, "Cisco Encrypted Traffic Analytics," White Paper, Cisco Public, 2019.

Cisco Public, "Cisco Security Analytics, A deep-dive into the unique behavioral modeling and machine learning techniques for advanced threat detection," White Paper, Cisco Public, 2018.

Cisco, "Encrypted Traffic Analytics, Solutions Adoption Prescriptive Reference—Design Guide," Oct. 2019.

Cisco, Thyagarajan, "Operationalizing ETA and Stealthwatch," BRKSEC-1000, Ciscolive!, Jun. 9-13, 2019, San Diego CA.

Cisco Public, "Encrypted Traffic Analytics," White Paper, 2017.

Geller et al., Cisco Public, "5G Security Innovation with Cisco," White Paper, 2018.

Marvell, "Marvell Octeon TX2 DPDK Overview," White Paper, Nov. 2020.

Raikar et al., "Data Traffic Classification in Software Defined Networks (SDN) using supervised-learning," ScienceDirect, Procedia Computer Science 171 (2020) 2750-2759.

Skipper, "The Relevance of Network Security in an Encrypted World," Network Detection and Response, vmware, Network and Security Virtualization, Sep. 29, 2020.

Sqalli, et al., "Classifying malicious activities in Honeynets using entropy and volume-based thresholds," Security and Communication Networks, Jun. 2013; 567-583.

Anonymous: "Deep packet inspection Wikipedia", Dec. 7, 2020 (Dec. 7, 2020), XP055908629, Retrieved from the Internet: URL:https://en.wikipedia.org/w/index.php?title=Deep_packet_inspection&oldid=99282177 1 [retrieved on Apr. 4, 2022] p. 9, line 14—p. 11, line 18.

Vinayaka Jyothi: "Hardware Accelerated-And-Assisted Novel Network Security Architectures", May 10, 2017 (May 10, 2017), XP055910053, Retrieved from the Internet: URL:https://www.proquest.com/docview/1914884836?pq-origsite=gscho1ar&fromopenview=true [retrieved on Apr. 6, 2022], p. 4, line 7—p. 9, line 11, p. 44, ilne 4—p. 45, line 3, p. 76, line 1—p. 79, line 15.

Non-Final Rejection for U.S. Appl. No. 17/548,089, entitled "System and Method for Intrusion Detection of Malware Traffic;" Mailed on Jan. 26, 2024; 18 page(s).

Final Office Action received for U.S. Appl. No. 17/548,089, mailed on Sep. 16, 2024, 22 pages.

Notice of Allowance received for U.S. Appl. No. 17/548,089, mailed on Sep. 9, 2025, 10 pages.

Notice of Allowance received for U.S. Appl. No. 17/548,089, mailed on Jan. 23, 2026, 2 pages.

U.S. Non-Final Office Action for U.S. Appl. No. 17/548,089, entitled "System and Method for Intrusion Detection of Malware Traffic," mailed on Mar. 12, 2025.

* cited by examiner

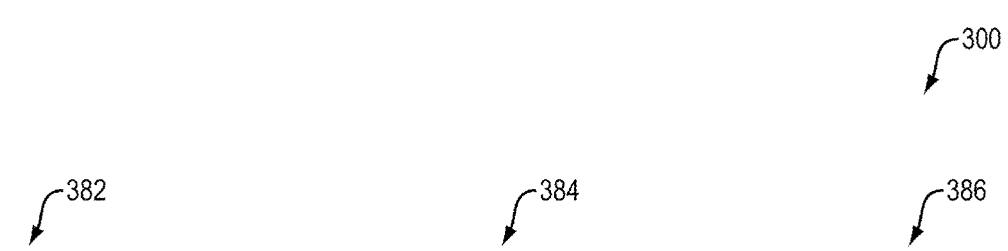

| COMMON FEATURES | TIME-FRAME FEATURES | ENTROPY FEATURES |
|---|---|---|
| Max packet size | Min forward inter arrival time | Source IP entropy |
| Mean packet size | Max forward inter arrival time | Destination IP entropy |
| Mean packet size | Max backward inter arrival time | Source port entropy |
| STD forward packets size | Forward peak MAX throughput | Destination port entropy |
| Min packet size | STD of packet time delta | Packet size entropy |
| Packet size variance | Max of packet time delta | Total packet count entropy |
| Mean forward time-to-live (TTL) | Mean of packet time delta | Cross Entropy between features |

FIG. 3

SYSTEM AND METHOD FOR INTRUSION DETECTION OF MALWARE TRAFFIC BASED ON FEATURE INFORMATION

RELATED APPLICATION

This application claims the benefit of U.S. Provisional Application No. 63/124,573, filed on Dec. 11, 2020. The entire teachings of the above application are incorporated herein by reference.

BACKGROUND

"Malware," short for "malicious software," includes viruses, worms, Trojans, ransomware, spyware, denial-of-service (DoS), etc. There is a constant threat from malicious users who are trying to disrupt normal operations or trying to steal information via malware. As such, network security is a prominent feature of a computer network to ensure protection against malware.

An intrusion detection system (IDS) application is an example of a network security application. The IDS application may, for non-limiting example, inspect content of individual packets flowing through a network and identify suspicious patterns that may indicate an attempt to break into or compromise a system. One non-limiting example of a suspicious pattern may be a particular text string in a packet followed 100 characters later by another particular text string. Such content aware networking may require inspection of the contents of packets at wire speed. The content may be analyzed to determine whether there has been a security breach or an intrusion.

A large number of patterns and rules in the form of regular expressions (also referred to herein as regular expression patterns or RegEx patterns) may be applied to detect security breaches or intrusions. A regular expression is a compact method for describing a pattern in a string of characters. The simplest pattern matched by a regular expression is a single character or string of characters, for example, /c/or/cat/. The regular expression may also include operators and meta-characters that have a special meaning. Through the use of meta-characters, the regular expression may be used for more complicated searches such as, "abc.*xyz;" that is, find the string "abc" followed by the string "xyz," with an unlimited number of characters in-between "abc" and "xyz." Another example is the regular expression "abc . . . abc.*xyz;" that is, find the string "abc," followed two characters later by the string "abc," and an unlimited number of characters later by the string "xyz." Content searching may be performed using a search method to process the regular expression. Such a search method may employ, for non-limiting example, a Deterministic Finite Automata (DFA), Non-Deterministic Finite Automata (NFA), or combination thereof.

SUMMARY

An example embodiment of a system-on-a-chip (SoC) comprises a traffic scanner configured to produce feature information associated with non-payload content of encrypted packets in a received traffic stream that cannot be decrypted by the SoC. The SoC further comprises a machine learning (ML) engine configured to (i) assign a classification to the received traffic stream based on the feature information produced and (ii) based on the classification assigned, provide notification to the traffic scanner that malware traffic has been detected in the traffic stream. The traffic scanner is further configured to perform, based on the notification provided, an action toward preventing malicious activity otherwise caused by malware traffic.

The action performed may include discarding the received traffic stream, generating an alert associated with the received traffic stream, or a combination thereof.

The SoC may further comprise a plurality of processor cores and at least one processor core of the plurality of processor cores may be configured to implement the traffic scanner.

The SoC may further comprise a deep packet inspection (DPI) engine. The traffic scanner may be further configured to employ the DPI engine to produce the feature information.

The classification assigned may be normal, known malware, or unknown malware and, in an event the classification assigned is known malware or unknown malware, the ML engine may be further configured to provide the notification to the traffic scanner.

The traffic scanner may be further configured to produce and share the feature information based on a time interval.

The traffic scanner may be further configured to apply a sliding window to the received traffic stream based on a time interval. The sliding window may be configured to capture packet data from the received traffic stream over the time interval on a time-interval-by-time-interval basis.

The feature information may include a maximum packet length, minimum packet length, or combination thereof, determined based on the packet data captured within the sliding window.

The traffic scanner may be further configured to produce the feature information by computing at least a portion of the feature information. The computing may be based on the packet data captured within the sliding window. The at least a portion of the feature information computed may include: packet size-based feature information, packet time-to-live-based feature information, packet time-based feature information, packet entropy-based feature information, or a combination thereof. It should be understood that the feature information is not limited to including packet-based feature information and may, for non-limiting example, include stream-based feature information and/or inter-stream-based feature information that is in addition to, or in lieu of, packet-based feature information.

The received traffic stream may be part of a secure session. The feature information may be further associated with non-encrypted content of an initial non-encrypted packet of the secure session.

According to another example embodiment, a method may comprise producing, by a traffic scanner of a system-on-a-chip (SoC), feature information associated with non-payload content of encrypted packets in a received traffic stream that cannot be decrypted by the SoC. The method may further comprise, by a machine learning (ML) engine of the SoC, (i) assigning a classification to the received traffic stream based on the feature information produced and (ii) based on the classification assigned, providing notification to the traffic scanner that malware traffic has been detected in the traffic stream. The method may further comprise performing, by the traffic scanner, based on the notification provided, an action toward preventing malicious activity otherwise caused by malware traffic.

Further alternative method embodiments parallel those described above in connection with the example SoC embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3 is a table with non-limiting example features that may be employed by a machine learning (ML) engine disclosed herein.

DETAILED DESCRIPTION

Figure 1A:
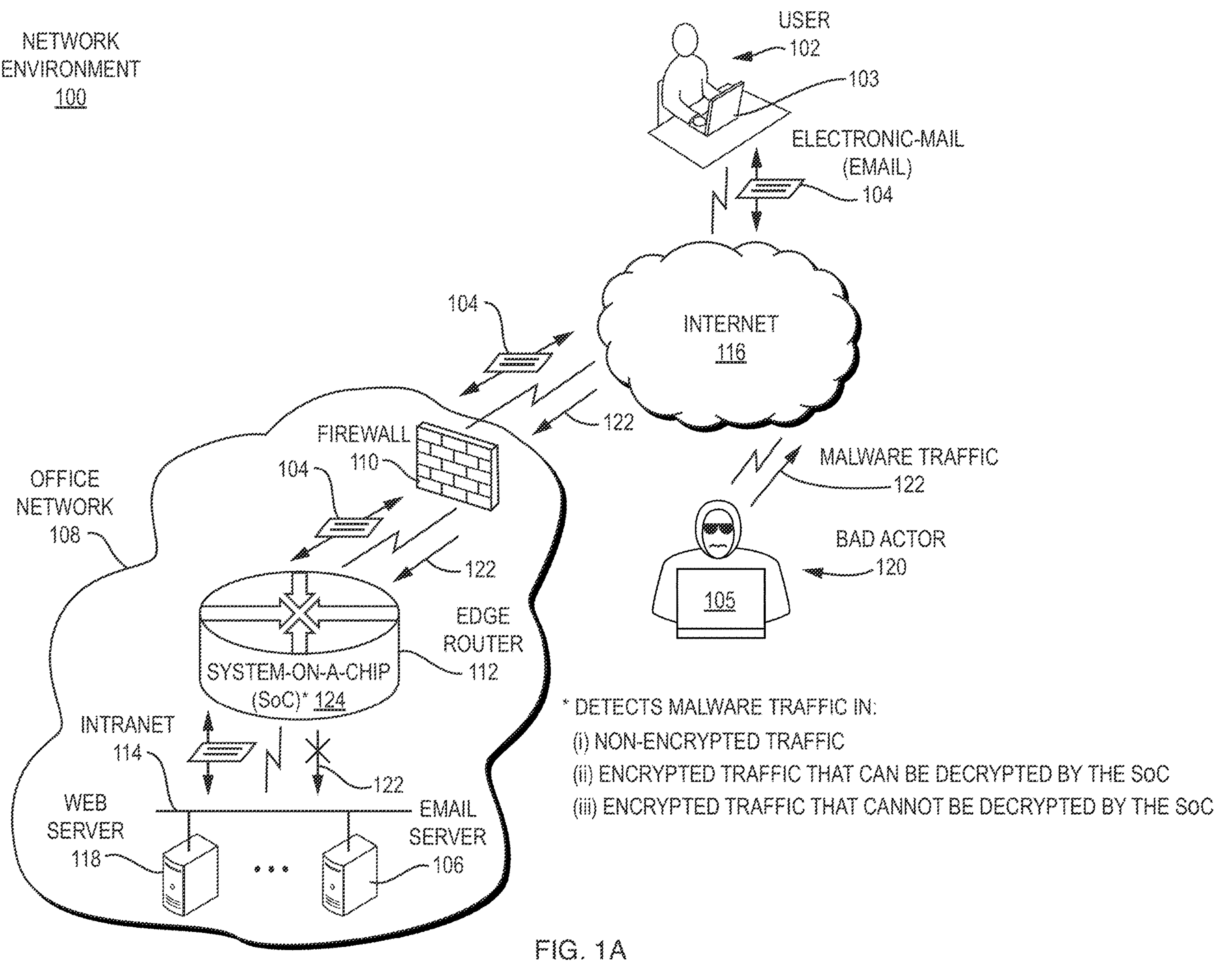
FIG. 1A is a block diagram of an example embodiment of a network environment within which an example embodiment for intrusion detection may be employed for non-limiting example.

A description of example embodiments follows.

It should be understood that a data packet, as referenced herein, may be any unit of communication over a digital network. Such a digital network may be referred to interchangeably herein as a computer network or, simply, a network, and may be any type of computer network, such as a local area network (LAN) or wide area network (WAN), for non-limiting example. The network may be a wired-network, wireless network, or combination thereof. Data packets may be used in Internet Protocol (IP) transmissions. It should be understood, however, that a data packet, also referred to interchangeably herein, simply, as a packet, is not limited to an IP transmission, and that a traffic stream (flow), as referenced herein, includes at least one packet sent from a source to a destination.

The term "malware," as referenced herein, refers to any malicious software, such as viruses, worms, Trojans, ransomware, spyware, denial-of-service (DoS), etc., for non-limiting example. Malware traffic may be referred to interchangeably herein as malware network traffic, malicious traffic, or malicious network traffic, and may, for non-limiting example, include a suspicious link or file, or cause a connection to be created via a network. Malware (malicious) traffic may also be referred to interchangeably herein as an attack.

Malicious activity, as referred to herein, may be any activity that impacts security of a device, system, or network, or compromises (jeopardizes) operation of the device, system, or network. For non-limiting example, the malicious activity may be an action that enables malware to be delivered to a destination, where such malware can, in turn, be activated to compromise a device, system, or network. The malicious activity may be any unauthorized activity in a public or private network.

The impact of malware on networks is constantly growing. Malware traffic may be encrypted or non-encrypted traffic and, as such, may be understood as causing an encrypted or non-encrypted attack. An encrypted attack can be severe, widespread, and challenging for a network to detect and, thus, recover from. The trend in networks has been that more and more traffic is encrypted and, thus, instances of encrypted malware traffic continues to grow.

An example embodiment disclosed herein performs traffic analysis for both non-encrypted (plain) traffic and encrypted traffic within a single device. According to an example embodiment, such traffic analysis may include offloading a task(s) to a machine learning (ML) engine, cryptographic (CPT) engine, deep packet inspection (DPI) engine, or combination thereof, each of which is implemented on the single device. The DPI engine may also be referred to interchangeably herein as a regular expression (RegEx, REE) engine.

The single device can identify both known and unknown attacks with a reduced area and power footprint relative to implementing aspects of malware traffic detection among multiple devices in order to detect the malware traffic in both non-encrypted and encrypted types of traffic. Since the ML, CPT, and DPI engines are included within a single device, latency, otherwise caused by communication between separate devices, is obviated and, thus, an impact on throughput due to communications between such devices is not incurred because the ML, CPT, and DPI engines are all implemented within the same device. Such a device can be employed for intrusion detection and prevention in a variety of areas/markets, such as in a consumer product or router/switch/firewall/server of a datacenter, etc., for non-limiting example. For non-limiting example, an edge router in an office network may employ the device, such as disclosed below with regard to FIG. 1A.

FIG. 1A is a block diagram of an example embodiment of a network environment 100 within which an example embodiment for intrusion detection may be employed for non-limiting example. In the network environment 100, a user 102 is using a computer laptop 103 to access the Internet 116 and send/receive electronic-mail (email) 104 via an email server 106 of an office network 108. The office network 108 includes a firewall 110 coupled to an edge router 112. The purpose of the firewall 110 is to implement a network security system for the office network 108. The edge router 112 is coupled to an Intranet 114 of the office network 108. Servers, such as the email server 106 and web server 118 are coupled to the Intranet 114. The edge router 112 enables such servers to connect to the Internet 116, thereby enabling transmission/reception of the email 104.

In the network environment 100, there is a bad actor 120 who intends to sabotage the office network 108 via malware (not shown) and the malware causes malware traffic 122 to be transmitted to the office network 108 via the Internet 116. In the example embodiment, the malware traffic 122 is designed to infect the email server 106 with an email virus (not shown) that would compromise operation of the email server 106 and otherwise cause the user 102 to be unable to send/receive the email 104. Such an activity, that is, infecting the email server 106 with the email virus, is considered to be a malicious activity. In the example embodiment of FIG. 1A, the firewall 110 is unable to detect the malware traffic 122 due to encryption thereof and, thus, does not prevent such malicious activity. The edge router 112 can, however, detect the malware traffic 122 which is encrypted and, thus, is able to prevent the malicious activity. The edge router 112 is able to do so because the edge router 112 includes an example embodiment of a system-on-chip (SoC), disclosed below with regard to FIG. 1B.

Figure 1B:
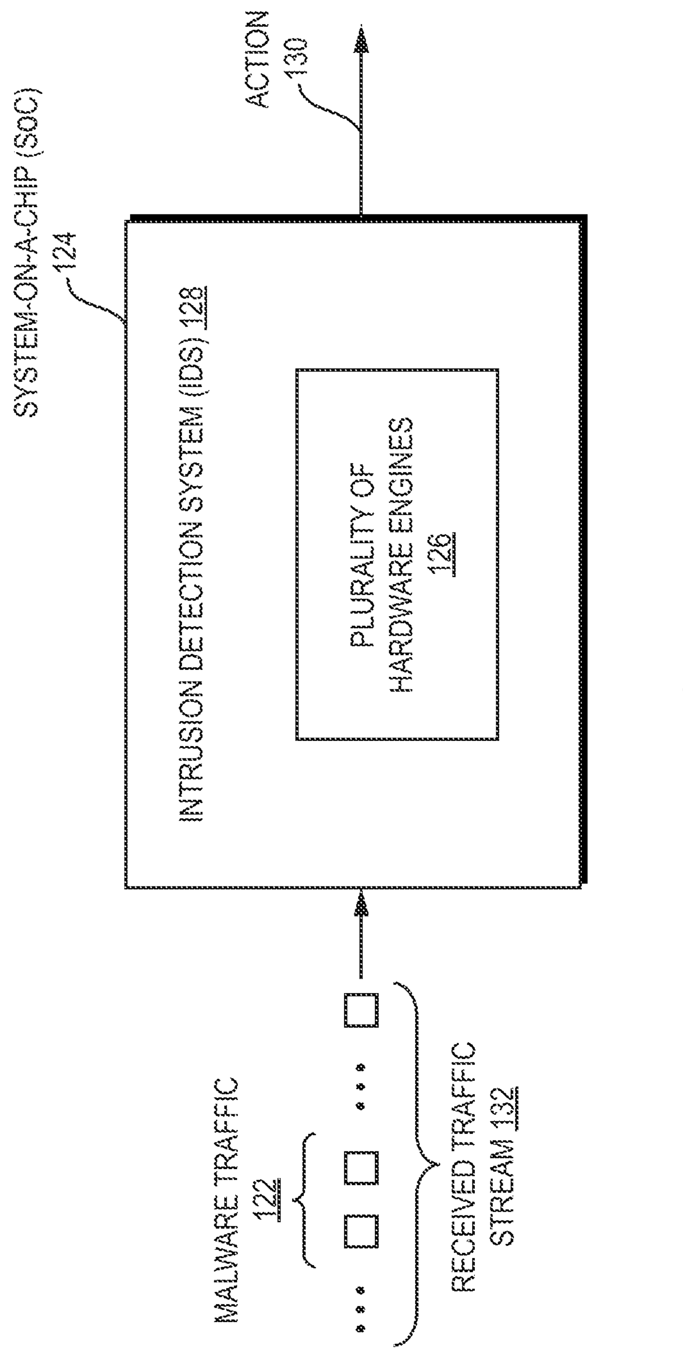
FIG. 1B is a block diagram of an example embodiment of a system-on-a-chip (SoC) of FIG. 1A.

FIG. 1B is a block diagram of an example embodiment of the SoC 124 of FIG. 1A, disclosed above. It should be understood that the SoC 124 is not limited to being employed by an edge router, such as the edge router 112, and may be employed in any electronic device within which intrusion detection may be beneficial, such as a server, router, firewall, laptop, tablet, smart phone, internet of things (IoT) device, personal computer, etc., for non-limiting example.

In the example embodiment of FIG. 1B, the SoC 124 comprises a plurality of hardware engines 126. The SoC 124 is configured to employ the plurality of hardware engines 126 to implement an intrusion detection system (IDS) 128 configured to detect malware traffic, such as the malware traffic 122, in (i) a non-encrypted traffic stream (not shown), (ii) an encrypted traffic stream (not shown) that can be decrypted by the SoC 124, and (iii) an encrypted traffic stream (not shown) that cannot be decrypted by the SoC 124. For example, the encrypted traffic stream may not include security associated information enabling decryption at the SoC 124, such as crypto keys and/or authentication keys for non-limiting example. The IDS 128 is further configured to perform an action 130 responsive to detecting the malware traffic 122 in a received traffic stream 132 that is of the type (i), (ii), or (iii). The action 130 is performed toward preventing malicious activity (not shown) otherwise caused by the malware traffic 122. The action 130 performed may include discarding the received traffic stream 132, generating an alert (not shown) that is associated with the received traffic stream 132, or a combination thereof, for non-limiting example.

While existing DPI engines may analyze plain traffic, that is, non-encrypted traffic, such systems suffer a weakness with regard to encrypted traffic. The SoC 124 is, in contrast, able to detect malware traffic irrespective of whether such traffic is encrypted or non-encrypted and, if encrypted, regardless of whether or not the SoC 124 can decrypt the encrypted traffic. As such, the SoC 124 may be considered to be an "all-in-one" product that can analyze all types of traffic for malware traffic. The SoC 124 that can analyze encrypted traffic as well as non-encrypted traffic is useful because, as shown in the chart 140 of FIG. 1C, disclosed below, encrypted traffic has been on the rise for a while.

Figure 1C:
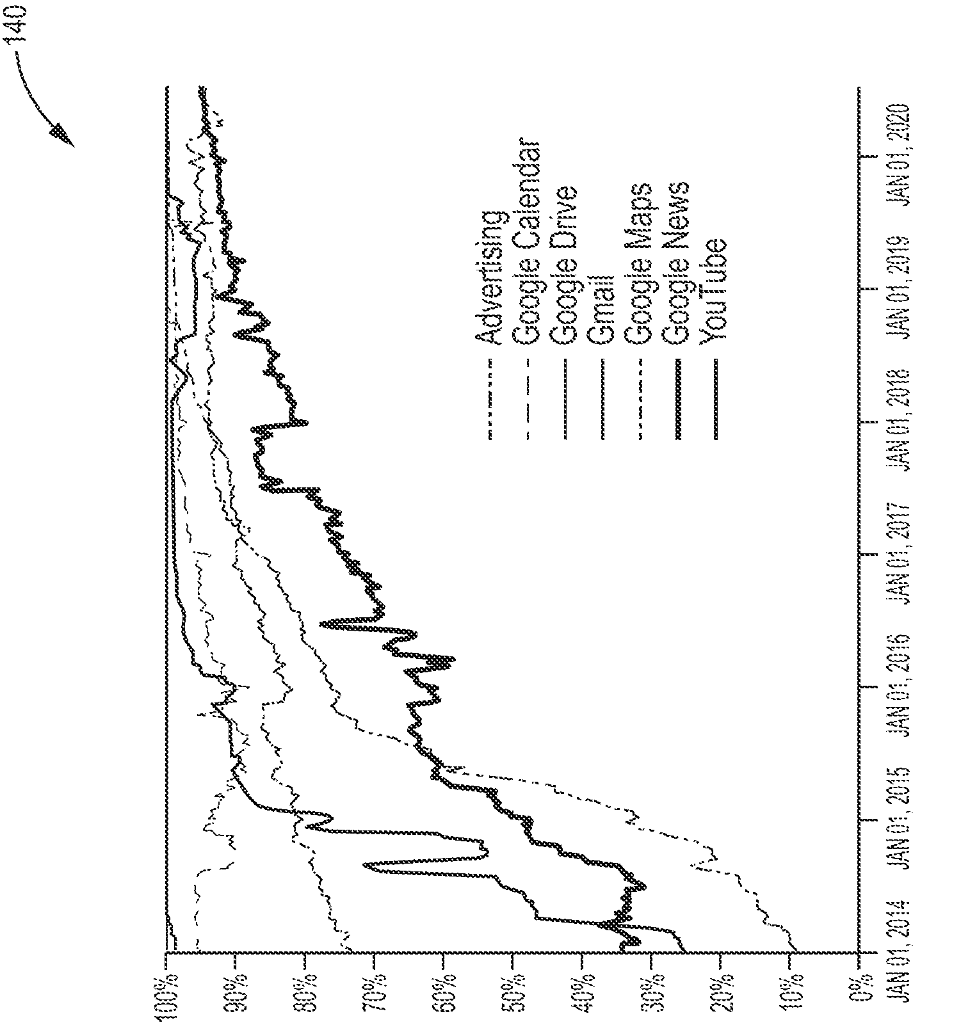
FIG. 1C is a chart that provides a snapshot of encrypted traffic for several products as captured in a Google Transparency Report.

FIG. 1C is a chart that provides a snapshot 140 of encrypted traffic for several products as captured in a Google Transparency Report. The chart is updated by Google over time and is available via https://transparencyreport.google.com/https/overview?hl=en. The snapshot 140 shows that as early as May 2019, 94% of all Google web traffic was encrypted.

Figure 1D:
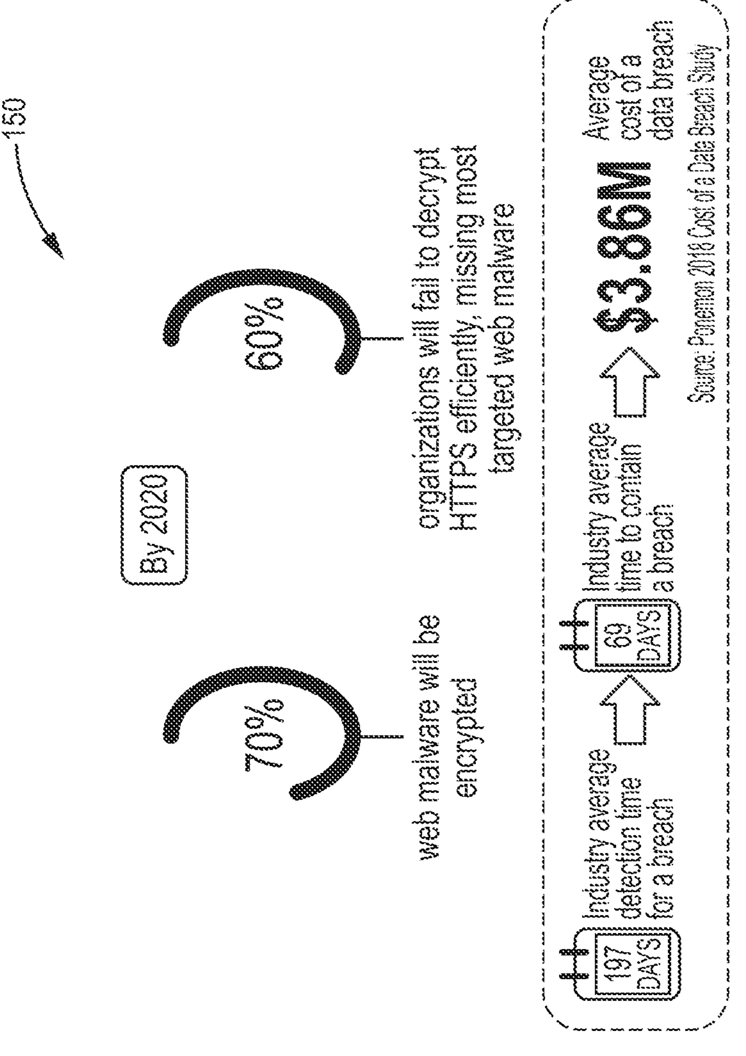
FIG. 1D is a summary of economic impact of malicious attack.

FIG. 1D is a summary 150 of economic impact of malicious attacks expected by 2020 based on a Ponemon 2018 Cost of a Data Breach Study. As noted in the summary 150, as early as 2020, more than 70% of malware campaigns were using some type of encryption to conceal mail delivery. Since encrypted malware traffic has become prevalent in networks, it is useful to have a solution that can detect malicious content, that is, malware traffic, in encrypted traffic as well as non-encrypted traffic and to do so without slowing down the network that employs such a solution. An example embodiment of the SoC 124 of FIG. 1A and FIG. 1B, disclosed above, provides such a solution. Further example embodiments of such a solution are disclosed below with regard to FIG. 2A.

Figure 2A:
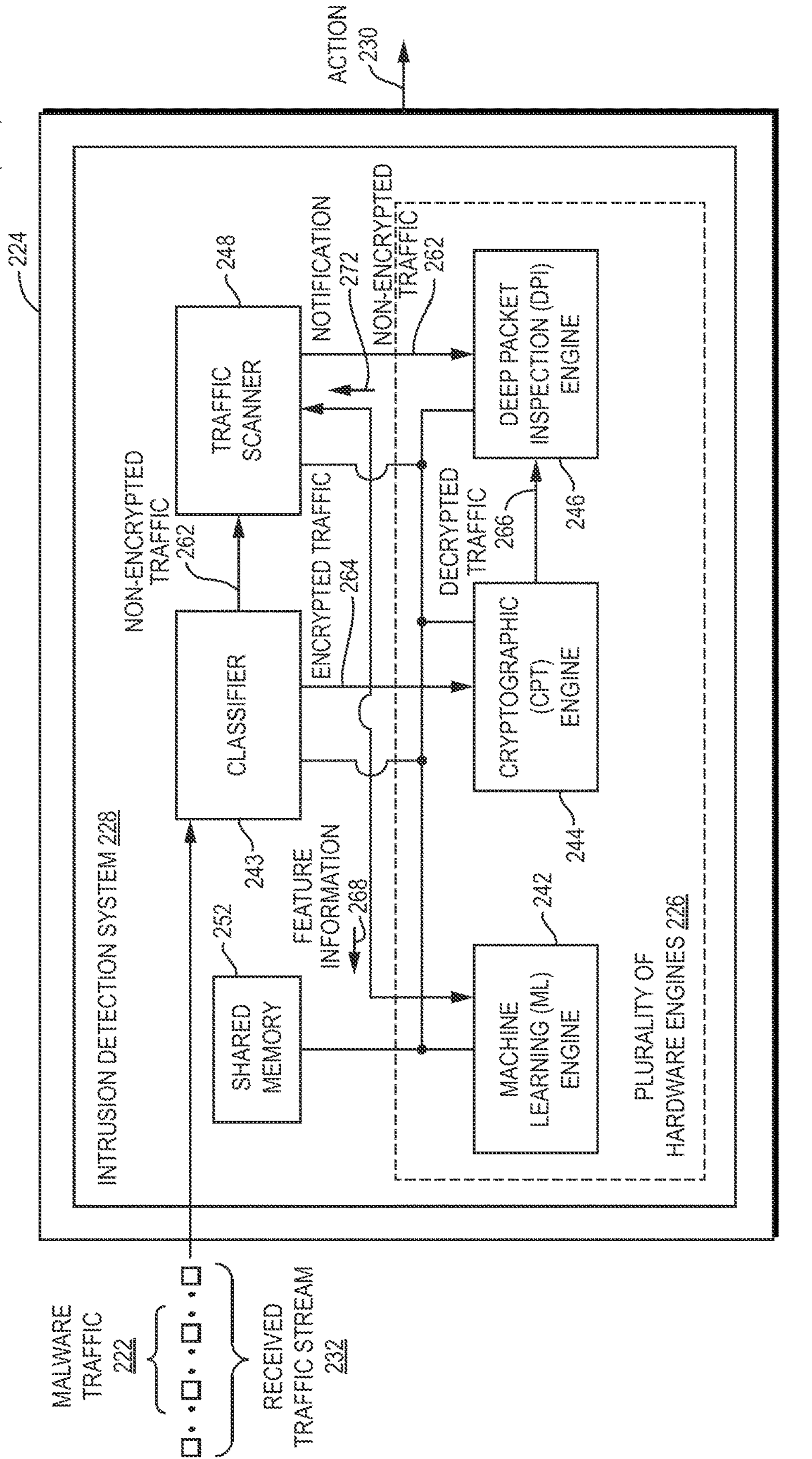
FIG. 2A is a block diagram of an example embodiment of an SoC that may be used for intrusion detection.

FIG. 2A is a block diagram of an example embodiment of a system-on-a-chip (SoC) 224 that may be used for intrusion detection. The SoC 224 may be employed as the SoC 124 of FIG. 1A and FIG. 1B, disclosed above. Continuing with reference to FIG. 2A, the SoC 224 comprises a plurality of hardware engines 226. The SoC 224 is configured to employ the plurality of hardware engines 226 to implement an intrusion detection system (IDS) 228 that is configured to detect malware traffic, such as the malware traffic 222, in (i) a non-encrypted traffic stream (not shown), (ii) an encrypted traffic stream (not shown) that can be decrypted by the SoC 124, and (iii) an encrypted traffic stream (not shown) that cannot be decrypted by the SoC 224. The IDS 228 is further configured to perform an action 230 responsive to detecting the malware traffic 222 in a received traffic stream 232 that is of the type (i), (ii), or (iii). The action 230 is performed toward preventing malicious activity (not shown) otherwise caused by the malware traffic 222.

The action 230 may include discarding the received traffic stream 232, generating an alert (not shown) that is associated with the received traffic stream 232, or a combination thereof, for non-limiting example. According to the example embodiment of FIG. 2A, the plurality of hardware engines 226 includes a machine learning (ML) engine 242, a cryptographic (CPT) engine 244, and a deep packet inspection (DPI) engine 246.

The SoC 224 supports multiple traffic analysis use cases as there are three types of traffic, namely (i), (ii), and (iii), to be considered for traffic analysis by the IDS 228. Non-encrypted traffic, received as plain text or pre-decrypted by the CPT engine 244, is traffic that may be analyzed by the DPI engine 246. Encrypted traffic which can be decrypted on the SoC 224 may be processed via the CPT engine 244 and the DPI engine 246. Encrypted traffic which cannot be decrypted on the SoC may be analyzed via the ML engine 242 and the DPI engine 246, as disclosed further below.

Continuing with reference to FIG. 2A, the SoC 224 further comprises a classifier 243 and a traffic scanner 248. The traffic scanner 248 may be configured to perform the action 230. The SoC 224 may further comprise a plurality of processor cores (not shown). At least one processor core (not shown) of the plurality of processor cores may be configured to implement the traffic scanner 248.

The classifier 243 may be configured to identify encrypted streams or packets which have security associated material (such as crypto and authentication keys, crypto suite, method specifications, etc., for non-limiting example) and that can be decrypted on the SoC 224. Such packets may be sent to the CPT engine 244 and, after decryption, sent to the traffic scanner 248. All other packets (e.g., non-encrypted, and encrypted which could not be decrypted) may be sent directly to the traffic scanner 248. It should be understood, however, that for a packet to be "sent" within the architecture of the SoC 224, such packets need not be transmitted.

For example, the SoC 224 may comprise a shared memory 252. The shared memory 252 may be accessed by the classifier 243, traffic scanner 248, ML engine 242, CPT engine 244, and DPI engine 246, each of which may have read/write access to the shared memory 252 for packet processing. The shared memory 252 may include a packet buffer (not shown) and may store meta data (not shown), associated with a respective packet, on a packet-by-packet basis. A packet, or portion thereof, in a form that has been processed or is as received at the SoC 224, may be stored in the shared memory 252. Instead of transmitting packet content itself, an example embodiment may employ a packet descriptor (data structure) for locating the content in order to process it. For non-limiting example, the packet descriptor may include a pointer or offset to a buffer including packet data, metadata regarding the packet, such as size, etc., and an instruction(s) for processing the packet. Such a packet descriptor may designate a next element for processing the content. As such, when the CPT engine 244 is employed for decryption and the DPI engine 246 is employed for analyzing the decrypted content, the traffic scanner 248 may direct the decrypted content to the DPI engine 246 via a packet descriptor(s), providing an inline connection between the CPT engine 244 and DPI engine 246, Such an inline connection can reduce latency relative to transmitting packet content between such engines. Such a packet descriptor(s) may, for example, define the CPT engine's response (e.g., decrypted content) direction to be from the CPT engine 244 back to the traffic scanner 248, or directly to the DPI engine 246.

According to an example embodiment, the classifier 243 may be configured to classify the received traffic stream 232 as (i), (ii), or (iii), namely, as (i) a non-encrypted traffic stream (not shown), (ii) an encrypted traffic stream (not shown) that can be decrypted by the SoC 124, or (iii) an encrypted traffic stream (not shown) that cannot be decrypted by the SoC 224. The IDS 228 may be further configured to employ the DPI engine 246 to detect the malware traffic 222 in an event the classifier classifies the received traffic stream 232 as (i), that is, the non-encrypted traffic stream. The IDS 228 may be further configured to employ the CPT engine 244 and DPI engine 246 to detect the malware traffic 222 in an event the classifier classifies the received traffic stream 232 as (ii), that is, an encrypted traffic stream that can be decrypted by the SoC 124. The IDS 228 may be further configured to employ the ML engine 242 and DPI engine 246 to detect the malware traffic 222 in an event the classifier 243 classifies the received traffic stream 232 as (iii), that is, an encrypted traffic stream (not shown) that cannot be decrypted by the SoC 224.

The DPI engine 246 may be configured to process non-encrypted traffic content for malware traffic via regular expression content searching/matching as is known in the art. In an event the received traffic stream 232 is classified by the classifier 243 as (i), that is, a non-encrypted traffic stream, the traffic scanner 248 may be configured to cause the DPI engine 246 to process the received traffic stream 232 to detect the malware traffic 222. As such, the non-encrypted traffic 262 may be sent to the traffic scanner 248 which, in turn, may send the non-encrypted traffic 262 to the DPI engine 246 for processing.

The CPT engine 244 may be configured to decrypt encrypted traffic content. In an event the received traffic stream 232 is classified by the classifier as (ii), that is, (ii) an encrypted traffic stream that can be decrypted by the SoC 124, the traffic scanner 248 may be configured to cause (e.g., via a packet descriptor(s) for non-limiting example) the CPT engine 244 to decrypt the encrypted traffic 264 of the received traffic stream 232 and produce the decrypted traffic 266. The traffic scanner 248 may be further configured to cause (e.g., via a packet descriptor(s) for non-limiting example) the DPI engine 246 to process the decrypted traffic 266 to detect the malware traffic 222 in the received traffic stream 232.

In an event the received traffic stream 232 is classified by the classifier 243 as (iii), that is, an encrypted traffic stream that cannot be decrypted by the SoC 224, the traffic scanner 248 may be configured to produce feature information 268 associated with non-payload content of encrypted packets in the received traffic stream 232. Such non-payload content (e.g., a packet header for non-limiting example) includes non-encrypted content. The traffic scanner 248 may be configured to share, with the ML engine 242, the feature information 268 produced. The ML engine 242 may be configured to classify the received traffic stream 232 based on the feature information 268 produced and shared. The traffic scanner 248 may be further configured to employ the DPI engine 246 to produce the feature information 268.

The ML engine 242 may be configured to perform supervised or unsupervised learning based on the feature information 268 to detect the malware traffic 222. Receiving the feature information 268 over time may enable the ML engine 242 to learn, over time, what to classify as anomalous and, following such a learning process, enable the ML engine 242 to classify a traffic stream (flow) as malware traffic and, thus, classify individual data packets thereof, as malware traffic.

According to an example embodiment, the ML engine 242 may be further configured to classify the received traffic stream 232 as normal, known malware, or unknown malware. Such classification may be based on the feature information 268 associated with the received traffic stream 232 as well as historical feature information associated with packets of the received traffic stream 232 and maintained by the traffic scanner 248. In an event the received traffic stream 232 is classified as known malware or unknown malware, the ML engine 242 may be further configured to provide the notification 272 to the traffic scanner 248 that the malware traffic 222 has been detected. The traffic scanner 248 may be further configured to perform the action 230, responsive to the notification 272 provided.

According to an example embodiment, the traffic scanner 248 may be further configured to produce and share the feature information 268 based on a time interval (not shown), such as a given number of minutes or seconds for non-limiting example. The traffic scanner 248 may be further configured to apply a sliding window (not shown) to the received traffic stream 232 based on the time interval. The sliding window may be configured to capture packet data (not shown) from the received traffic stream 232 over the time interval on a time-interval-by-time-interval basis. The feature information 268 may include a maximum packet length, minimum packet length, or combination thereof, determined based on the packet data captured within the sliding window.

The traffic scanner 248 may be further configured to produce the feature information 268 by computing at least a portion of the feature information 268. The computing may be based on the packet data captured within the sliding window. The at least a portion of the feature information 268 computed may include packet size-based feature information, packet time-to-live-based (TTL-based) feature information, packet time-based feature information, packet entropy-based feature information, or a combination thereof, for non-limiting example. Entropy is a measure of how random a data set is. The more random the data set, the more entropy it contains. It should be understood that the feature information 268 is not limited to including packet-based feature information and may, for non-limiting example, include stream-based feature information and/or inter-stream-based feature information that is in addition to, or in lieu of, packet-based feature information.

According to an example embodiment, the received traffic stream 232 may be part of a secure session (not shown). The feature information 268 may be further associated with non-encrypted content of an initial non-encrypted packet of the secure session. The initial non-encrypted packet may include data, such as a HyperText Transfer Protocol (HTTP), uniform resource locator (URL), domain name system (DNS) hostname/address, or other data elements for non-limiting example, that may be useful feature information for detecting the malware traffic. FIG. 3, disclosed further below, discloses additional feature information that may be employed by the machine learning engine 242.

As disclosed above with regard to FIG. 2A, the received traffic stream 232 may be classified by the classifier 243 as (i), (ii), or (iii), namely, as (i) a non-encrypted traffic stream (not shown), (ii) an encrypted traffic stream (not shown) that can be decrypted by the SoC 124, or (iii) an encrypted traffic stream (not shown) that cannot be decrypted by the SoC 224. The received traffic stream 232 includes at least one received (RX) packet and the classifier 243 may classify on a packet-by-packet basis. The received traffic stream 232 and, thus, the at least one RX packet, may be received by the SoC 224 at a receive (RX) port, such as disclosed below with regard to FIG. 2B.

Figure 2B:
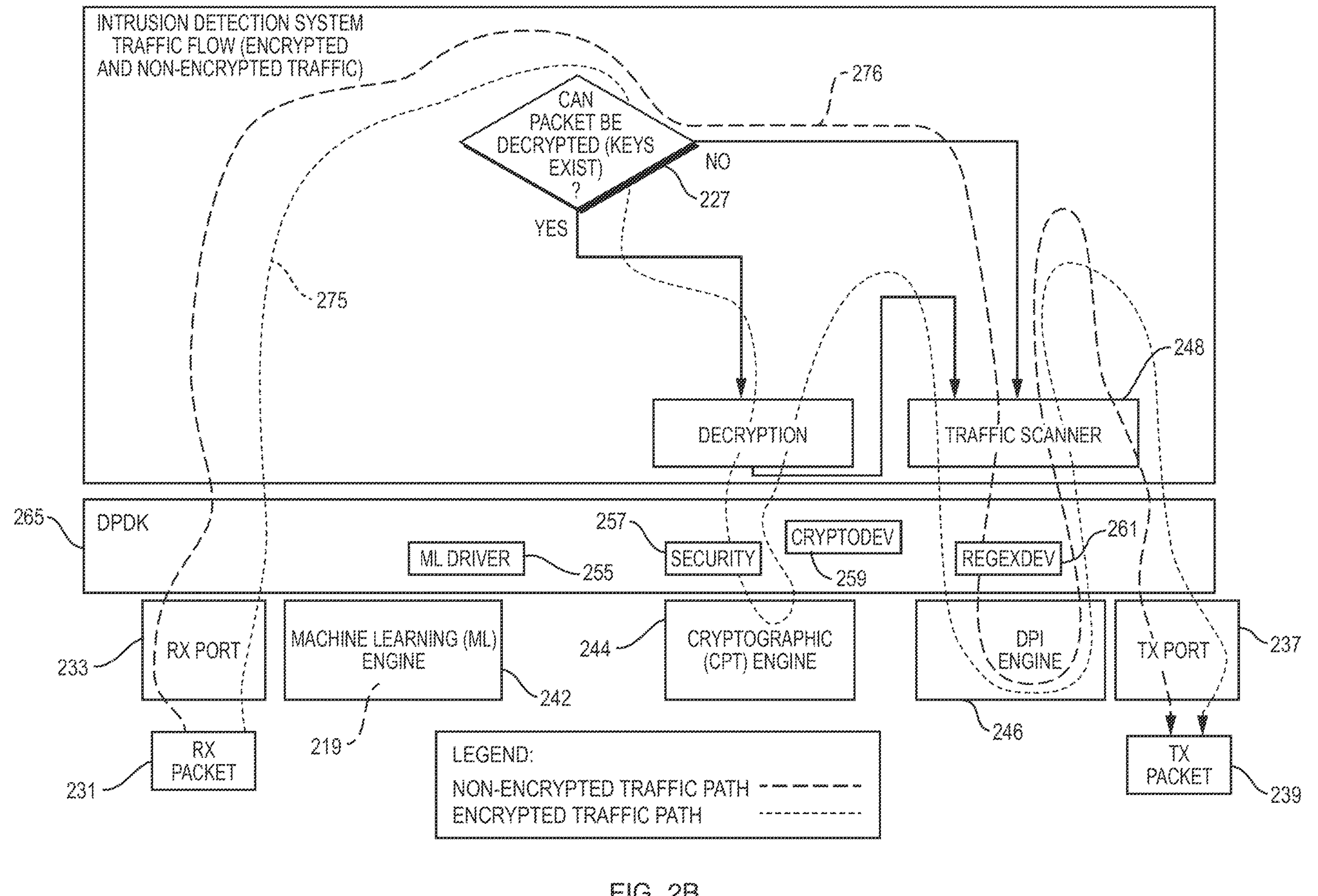
FIG. 2B is a block diagram of an example embodiment of traffic flow in the IDS system of the SoC of FIG. 2A.

FIG. 2B is a block diagram of an example embodiment of traffic flow in the IDS 228 of the SoC 224 of FIG. 2A, disclosed above. The block diagram includes a DPDK 265 layer that abstracts the SoC's security capabilities and represents a data plane development kit (i.e., DPDK) with device drivers, such as the ML driver 255 for the ML engine 242, the security driver 257 and crypto-development driver 259 for the CPT engine 244, and the regex-development driver 261 for the DPI engine 246. As is known in the art, device drivers may include software libraries that initialize and manage access to embedded hardware by higher layers of software. A device driver for the ML engine 242, CPT engine 244, and DPI engine 246, may provide abstraction for such engines by acting as a translator between the respective hardware engine and an application executing on the SoC 224 that uses it.

In the example embodiment of FIG. 2B an RX packet 231 is received at an RX port 233 of the SoC 224. The RX port 233 may be any type of port capable of receiving a data packet. It should be understood that the SoC 224 is not limited to having a single RX port and may have a plurality of RX ports and transmit (TX) ports that are of the same or a combination of different types. In the example embodiment of FIG. 2B, if the RX packet 231 is non-encrypted (plain), then the RX packet 231 follows the non-encrypted traffic path 276. It should be understood that the non-encrypted traffic path 276 is not a physical path and represents a processing flow for the RX packet 231 in an event the RX packet 231 is non-encrypted.

If the RX packet 231 is encrypted, and a check 227 for whether or not the RX packet 231 can be decrypted is yes, then the encrypted traffic path 275 for non-encrypted (plain) data is followed. It should be understood that the non-encrypted traffic path 276 is not a physical path and represents a processing flow for the RX packet 231 in an event the RX packet 231 is encrypted and can be decrypted by the SoC 224.

Regardless of which traffic processing path is followed, if the RX packet 231 is not found to be malware traffic, then the RX packet 231 is transmitted from the TX port 237 as the TX packet 239, as directed by the traffic scanner 248.

In the example embodiment of FIG. 2B, if the RX packet 231 follows the non-encrypted (plain) traffic path 276, the RX packet 231 will be analyzed by the DPI engine 246 to determine whether or not the RX packet 231 is malware traffic. If not, the traffic scanner 248 directs the RX packet 231 to be transmitted, as disclosed above. If, however, the RX packet 231 is encrypted traffic that can be decrypted, the RX packet 231 follows the encrypted traffic path 275 wherein the CPT engine 244 decrypts the RX packet 231 and the decrypted version of the RX packet 231 is then, in turn, analyzed by the DPI engine 246 to determine whether the RX packet 231 is malware traffic. If not detected to be malware traffic, then the RX packet 231 is transmitted from the TX port 237 as the TX packet 239, as directed by the traffic scanner 248.

Figure 2C:
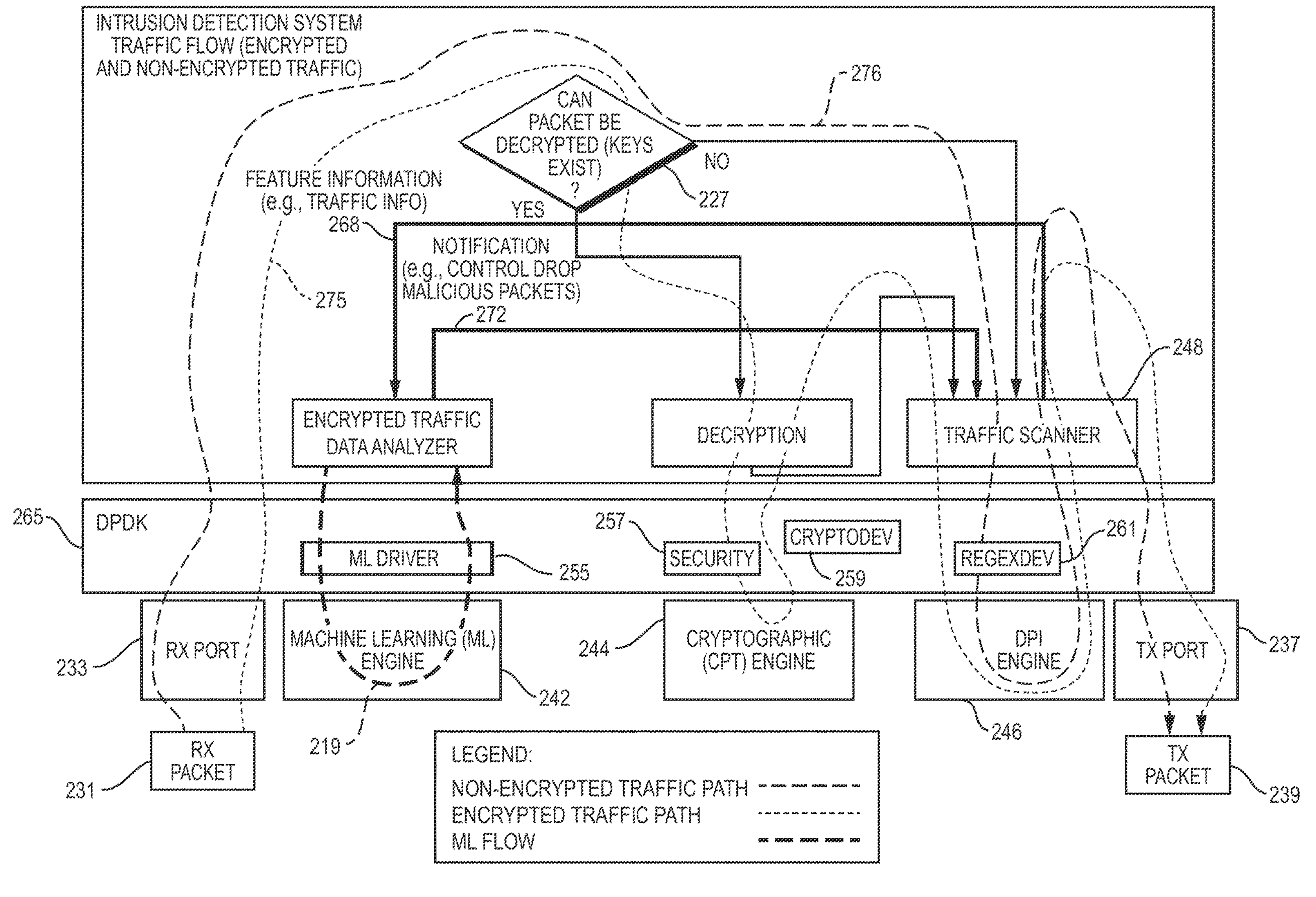
FIG. 2C is a block diagram of another example embodiment of traffic flow in the IDS system of the SoC of FIG. 2A.

FIG. 2C is a block diagram of another example embodiment of traffic flow in the IDS 228 of the SoC 224 of FIG. 2A, disclosed above. The example embodiment of FIG. 2C includes the ML flow 219 that may be employed in an event the RX packet 231 is encrypted traffic which cannot be decrypted on the SoC 224, as determined by the check 227. In such a case, the ML engine 242 and DPI engine 246 may be employed to determine whether the RX packet 231 is malware traffic. While the payload of the RX packet 231 may be encrypted, the DPI engine 246 may still be employed, for example, by the traffic scanner 248, to gather statistics/parameters that enables the traffic scanner 248 to compute at least a portion of the feature information 268 shared with the ML engine 242 to enable the ML engine 242 to determine whether the RX packet 231 is malware traffic.

In the example embodiment of FIG. 2C, the ML engine 242 employs the feature information 268 from the traffic scanner 248 and provides the notification 272 to the traffic scanner 248 in an event the ML engine determines that the RX packet 231 is malware traffic, in which case, the traffic scanner may cause the SoC to drop the RX packet 231 for non-limiting example. FIG. 3, disclosed below, provides non-limiting detail regarding example features that may be employed by the machine learning engine 242 in making such a determination.

FIG. 3 is a table 300 of non-limiting example features that may be employed by the ML engine 242, disclosed above with regard to FIGS. 2A-C. Such features in the table 300 are for non-limiting example. The table 300 includes a listing of common features 382, time-frame features 384, and entropy features 386. The common features 382 include non-limiting examples of packet size-based feature information as well as packet time-to-live-based (TTL-based) feature information. The time-frame features 384 include non-limiting examples of packet size-based feature information. The entropy features 386 include non-limiting examples of packet entropy-based feature information. The ML engine 242, disclosed above with regard to FIGS. 2A-C, may, for non-limiting example, employ at least one feature of the features in the table 300 of FIG. 3 to classify an encrypted stream that cannot be decrypted by the SoC, as disclosed above. Such classification by the ML engine 242 may be based on anomaly detection, such as disclosed below with regard to FIG. 4.

Figure 4:
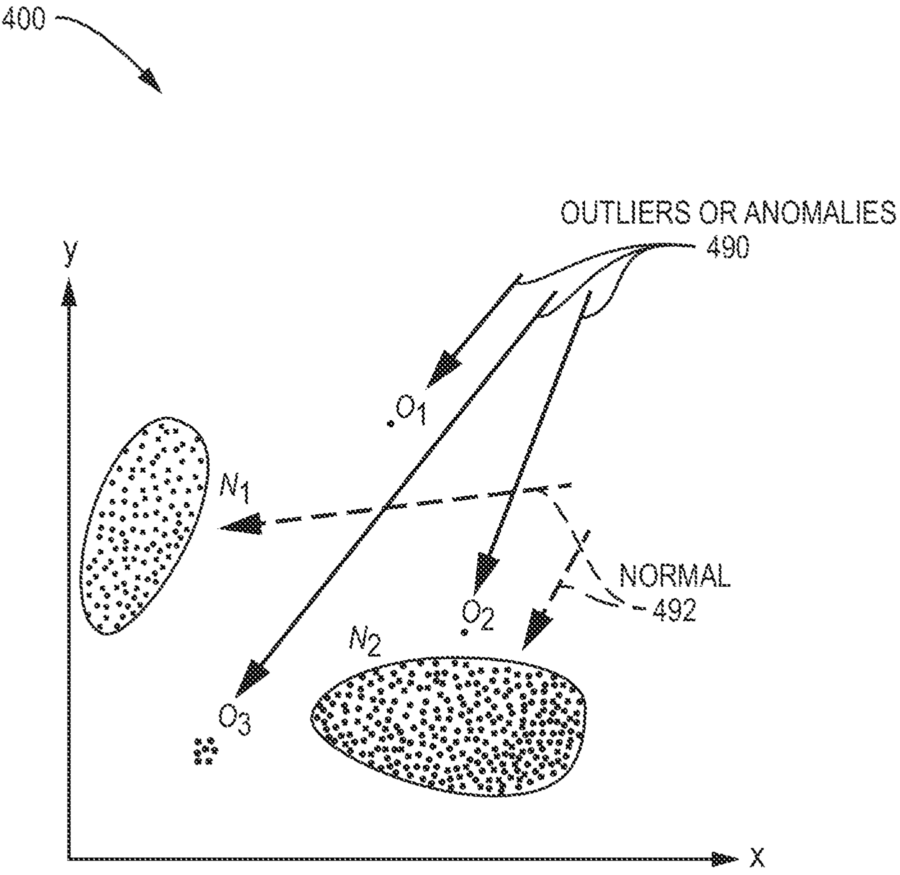
FIG. 4 is a prior art graph of anomalies or outliers.

FIG. 4 is a prior art graph 400 of outliers or anomalies 490 (e.g., $O_1$, $O_2$, and $O_3$) and normal 492 patterns (e.g., $N_1$ and $N_2$) disclosed in Sqalli, et al., "*Classifying malicious activities in Honeynets using entropy and volume-based thresholds*," Security and Communication Networks, 2013; 6; 567-583 (hereinafter, "Sqalli"). As disclosed in Sqalli, anomaly detection refers to a technique for detecting patterns that are different from normal behavior. Anomaly detection helps to identify new or unknown patterns within any data set. The outliers or anomalies 490 represent abnormal patterns within a data set. With reference to FIG. 4 and FIGS. 2A-C, disclosed above, according to an example embodiment, the ML engine 242 may apply a known anomaly detection technique(s) to the feature information 268 provided by the traffic scanner 248 to classify an encrypted stream that cannot be decrypted by the SoC 224 as being normal, a known thread, or having unknown anomalies such that the ML engine 242 can inform the traffic scanner 248 about an attack via the notification 272. Responsive to the notification 272, the traffic scanner 248 can cause the SoC 224 to drop the packets of the encrypted stream.

Figure 5:
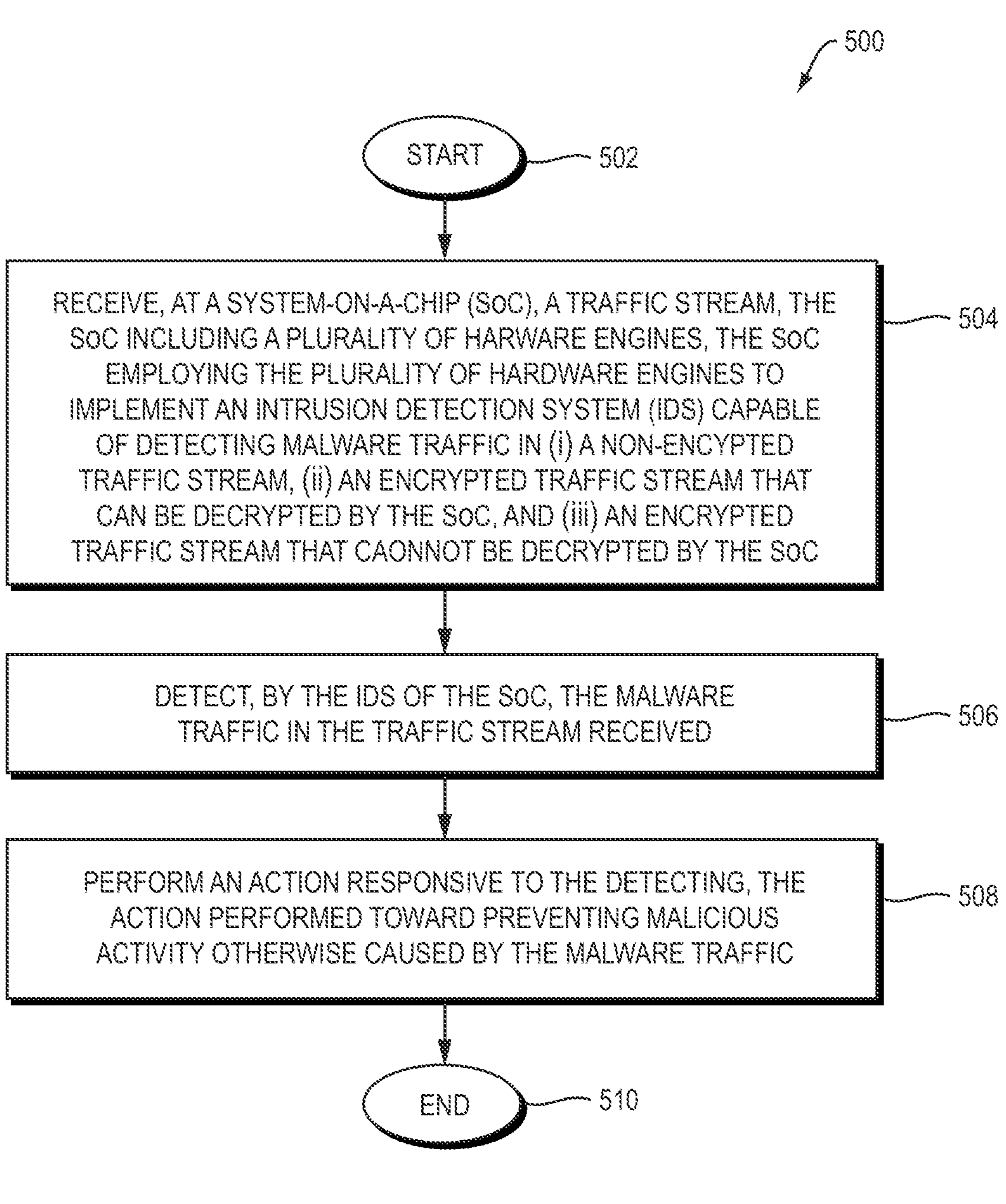
FIG. 5 is a flow diagram of an example embodiment of a method for intrusion detection.

FIG. 5 is a flow diagram 500 of an example embodiment of a method for intrusion detection. The method begins (502) and receives (504), at a system-on-a-chip (SoC), a traffic stream. The SoC includes a plurality of hardware engines. The SoC employs the plurality of hardware engines to implement an intrusion detection system (IDS) capable of detecting malware traffic in (i) a non-encrypted traffic stream, (ii) an encrypted traffic stream that can be decrypted by the SoC, and (iii) an encrypted traffic stream that cannot be decrypted by the SoC. The method detects (506), by the IDS of the SoC, the malware traffic in the traffic stream received. The traffic stream is received as (i), (ii), or (iii). The method performs (508) an action responsive to the detecting. The action is performed toward preventing malicious activity otherwise caused by the malware traffic. The method thereafter ends (510) in the example embodiment.

The method may further comprise performing the action by the traffic scanner. The performing may include discarding the received traffic stream, generating an alert associated with the received traffic stream, or a combination thereof.

The method may further comprise classifying the received traffic stream as (i), (ii), or (iii), employing the DPI engine to detect the malware traffic in an event the received traffic stream is classified as (i) (i.e., a non-encrypted traffic stream), employing the CPT engine and DPI engine to detect the malware traffic in an event the received traffic stream is classified as (ii) (i.e., an encrypted traffic stream that can be decrypted by the SoC), and employing the ML engine and DPI engine to detect the malware traffic in an event the received traffic stream is classified as (iii) (i.e., an encrypted traffic stream that cannot be decrypted by the SoC).

The method may further comprise processing non-encrypted traffic content by the DPI engine and, in an event the received traffic stream is classified by the classifier as (i) (i.e., a non-encrypted traffic stream), causing, by the traffic scanner, the DPI engine to process the received traffic stream to detect the malware traffic.

The method may further comprise processing non-encrypted traffic content by the DPI engine, decrypting encrypted traffic content by the CPT engine and, in an event the received traffic stream is classified by the classifier as (ii) (i.e., an encrypted traffic stream that can be decrypted by the SoC), the method may further comprise causing, by the traffic scanner: a) the CPT engine to decrypt encrypted traffic of the received traffic stream and produce decrypted traffic and b) the DPI engine to process the decrypted traffic to detect the malware traffic in the received traffic stream.

In an event the received traffic stream is classified by the classifier as (iii) (i.e., an encrypted traffic stream that cannot be decrypted by the SoC), the method further may further comprise producing, by the traffic scanner, feature information, the feature information associated with non-payload content of encrypted packets in the received traffic stream, and sharing, with the ML engine, the feature information produced. The method may further comprise classifying, by the ML engine, the received traffic stream based on the feature information produced and shared. The method may further comprise, by the traffic scanner, employing the DPI engine to produce the feature information.

The method may further comprise classifying, by the ML engine, the received traffic stream as normal, known malware, or unknown malware. In an event the received traffic stream is classified as known malware or unknown malware, the method may further comprise providing, by the ML engine, notification to the traffic scanner that the malware traffic has been detected, and performing, by the traffic scanner, the action, responsive to the notification provided.

The method may further comprise, by the traffic scanner, producing and sharing the feature information based on a time interval.

The method may further comprise applying, by the traffic scanner, a sliding window to the received traffic stream based on the time interval. The sliding window may be configured to capture packet data from the received traffic stream over the time interval on a time-interval-by-time-interval basis. The feature information may include a maximum packet length, minimum packet length, or combination thereof, determined based on the packet data captured within the sliding window.

The method may further comprise, by the traffic scanner, producing the feature information by computing at least a portion of the feature information. The computing may be based on the packet data captured within the sliding window.

The method may further comprise employing the shared memory by the plurality of hardware engines. The method may further comprise, by the traffic scanner, employing packet descriptors to direct communications among the plurality of hardware engines.

Further example embodiments disclosed herein may be configured using a computer program product; for example, controls may be programmed in software for implementing example embodiments. Further example embodiments may include a non-transitory computer-readable medium that contains instructions that may be executed by a processor, and, when loaded and executed, cause the processor to complete an example embodiment of a method described herein. It should be understood that elements of the block and flow diagrams may be implemented in software or hardware, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system-on-a-chip (SoC) comprising:

a deep packet inspection (DPI) engine;

at least one processor core, the at least one processor core of the SoC configured to implement a traffic scanner configured to produce feature information associated with non-payload content of encrypted packets in a received traffic stream that cannot be decrypted by the SoC; and a machine learning (ML) engine, the traffic scanner of the SoC further configured to provide the feature information produced to the ML engine of the SoC and to employ the DPI engine of the SoC to compute at least a portion of the feature information associated with the non-payload content of encrypted packets in the received traffic stream that cannot be decrypted by the SoC due to missing security associated information in the received traffic stream enabling decryption at the SoC, the ML engine of the SoC implemented in hardware and configured to (i) assign a classification to the received traffic stream based on the feature information produced and (ii) based on the classification assigned, provide notification to the traffic scanner that malware traffic has been detected in the traffic stream, the traffic scanner further configured to perform, based on the notification provided, an action toward preventing malicious activity otherwise caused by malware traffic.

2. The SoC of claim 1, wherein the action performed includes discarding the received traffic stream, generating an alert associated with the received traffic stream, or a combination thereof.

3. The SoC of claim 1, wherein the SoC further comprises a plurality of processor cores and wherein at least one processor core of the plurality of processor cores is configured to implement the traffic scanner.

4. The SoC of claim 1, wherein the classification assigned is normal, known malware, or unknown malware and wherein, in an event the classification assigned is known malware or unknown malware, the ML engine is further configured to provide the notification to the traffic scanner.

5. The SoC of claim 1, wherein the traffic scanner is further configured to produce and share the feature information based on a time interval.

6. The SoC of claim 1, wherein the traffic scanner is further configured to apply a sliding window to the received traffic stream based on a time interval and wherein the sliding window is configured to capture packet data from the received traffic stream over the time interval on a time-interval-by-time-interval basis.

7. The SoC of claim 6, wherein the feature information includes a maximum packet length, minimum packet length, or combination thereof, determined based on the packet data captured within the sliding window.

8. The SoC of claim 6, wherein the traffic scanner is further configured to produce the feature information by computing at least a portion of the feature information, wherein the computing is based on the packet data captured within the sliding window, and wherein the at least a portion of the feature information computed includes: packet size-based feature information, packet time-to-live-based feature information, packet time-based feature information, packet entropy-based feature information, or a combination thereof.

9. The SoC of claim 1, wherein the received traffic stream is part of a secure session and wherein the feature information is further associated with non-encrypted content of an initial non-encrypted packet of the secure session.

10. The SoC of claim 1, wherein the feature information includes packet entropy-based feature information.

11. The SoC of claim 1, wherein the feature information includes packet time-to-live-based feature information.

12. A method comprising:

producing, by a traffic scanner of a system-on-a-chip (SoC), feature information associated with non-payload content of encrypted packets in a received traffic stream that cannot be decrypted by the SoC;

providing, by the traffic scanner of the SoC, the feature information produced to a machine learning (ML) engine of the SoC, the producing including employing, by the traffic scanner of the SoC, a DPI engine of the SoC to compute at least a portion of the feature information associated with the non-payload content of encrypted packets in the received traffic stream that cannot be decrypted by the SoC due to missing security associated information in the received traffic stream enabling decryption at the SoC;

by the ML engine of the SoC, (i) assigning a classification to the received traffic stream based on the feature information produced and (ii) based on the classification assigned, providing notification to the traffic scanner that malware traffic has been detected in the traffic stream; and performing, by the traffic scanner, based on the notification provided, an action toward preventing malicious activity otherwise caused by malware traffic.

13. The method of claim 12, wherein performing the action includes discarding the received traffic stream, generating an alert associated with the received traffic stream, or a combination thereof.

14. The method of claim 12, wherein the SoC comprises a plurality of processor cores and wherein at least one processor core of the plurality of processor cores is configured to implement the traffic scanner.

15. The method of claim 12, wherein the classification assigned is normal, known malware, or unknown malware and wherein, in an event the classification assigned is known malware or unknown malware, the method further comprises providing, by the ML engine, the notification to the traffic scanner.

16. The method of claim 12, wherein producing the feature information includes sharing the feature information based on a time interval.

17. The method of claim 12, further comprising, by the traffic scanner, applying a sliding window to the received traffic stream based on a time interval and wherein the sliding window is configured to capture packet data from the received traffic stream over the time interval on a time-interval-by-time-interval basis.

18. The method of claim 17, further comprising determining the feature information based on the packet data captured within the sliding window and wherein the feature information includes a maximum packet length, minimum packet length, or combination thereof, determined based on the packet data captured within the sliding window.

19. The method of claim 17, wherein produce the feature information includes computing at least a portion of the feature information, wherein the computing is based on the packet data captured within the sliding window, and wherein the at least a portion of the feature information computed includes: packet size-based feature information, packet time-to-live-based feature information, packet time-based feature information, packet entropy-based feature information, or a combination thereof.

20. The method of claim 12, wherein the received traffic stream is part of a secure session and wherein the feature information is further associated with non-encrypted content of an initial non-encrypted packet of the secure session.

21. The method of claim 12, wherein the feature information includes packet entropy-based feature information.

22. The method of claim 12, wherein the feature information includes packet time-to-live-based feature information.

* * * * *